(12) United States Patent
Miglianico et al.

(10) Patent No.: US 10,086,855 B2
(45) Date of Patent: Oct. 2, 2018

(54) DRIVING ASSISTANCE DEVICE FOR A RAILWAY VEHICLE, COMPRISING PROGRESSIVE MEANS FOR INDICATING INSTRUCTIONS

(71) Applicant: Alstom Transport Technologies, Saint-Ouen (FR)

(72) Inventors: Denis Miglianico, Paris (FR); Simon Enjalbert, Saint Saulve (FR); Mathieu Mouchel, Iwuy (FR); Rudy Dahyot, Caudry (FR); Luc Moyart, La Madeleine (FR); Frédéric Vanderhaegen, Valenciennes (FR)

(73) Assignee: Alstom Transport Technologies, Saint Ouen (FR)

( * ) Notice: Subject to any disclaimer, the term of this patent is extended or adjusted under 35 U.S.C. 154(b) by 0 days.

(21) Appl. No.: 15/432,345

(22) Filed: Feb. 14, 2017

(65) Prior Publication Data

US 2017/0232983 A1  Aug. 17, 2017

(30) Foreign Application Priority Data

Feb. 15, 2016  (FR) ...................................... 16 51208

(51) Int. Cl.
*G06F 7/00* (2006.01)
*B61L 15/00* (2006.01)
(Continued)

(52) U.S. Cl.
CPC ............ *B61L 15/009* (2013.01); *B60T 17/22* (2013.01); *B61L 3/006* (2013.01); *B61L 3/008* (2013.01)

(58) Field of Classification Search
USPC ........................................................ 701/19
See application file for complete search history.

(56) References Cited

U.S. PATENT DOCUMENTS

| 3,714,624 | A | * | 1/1973 | Story | ................... | G01R 13/406 |
| | | | | | | 340/971 |
| 5,340,062 | A | * | 8/1994 | Heggestad | .............. | B61L 3/008 |
| | | | | | | 246/167 R |

(Continued)

FOREIGN PATENT DOCUMENTS

| DE | 115946 | 12/1963 |
| DE | 102012204120 A1 | 9/2013 |

(Continued)

OTHER PUBLICATIONS

French Patent Application No. 16 51208, Rapport de Recherche Préliminaire, Nov. 3, 2016, 3 pages.

*Primary Examiner* — Tyler D Paige
(74) *Attorney, Agent, or Firm* — Soquel Group LLC

(57) ABSTRACT

A driving assistance device including means for determining a target speed, means for comparing an instantaneous speed of the railway vehicle with the target speed or with an interval around the target speed, and means for displaying driving instructions intended for a conductor of the railway vehicle, the driving instructions including instructions for modifying the instantaneous speed in order to bring it closer to the target speed, the display means being configured to: display a speed increase instruction icon when the instantaneous speed is below a first predetermined value, and to display a speed decrease instruction icon when the instantaneous speed is above a second predefined value.

8 Claims, 2 Drawing Sheets

(51) Int. Cl.
  *B60T 17/22* (2006.01)
  *B61L 3/00* (2006.01)

(56) References Cited

U.S. PATENT DOCUMENTS

| | | | |
|---|---|---|---|
| 8,509,971 | B1 | 8/2013 | Isailovski et al. |
| 2004/0238693 | A1* | 12/2004 | Cole .................. B61L 15/0072 246/3 |
| 2007/0219680 | A1* | 9/2007 | Kumar .................... B61L 3/006 701/19 |
| 2007/0219683 | A1* | 9/2007 | Daum .................... B61L 3/006 701/19 |
| 2008/0167766 | A1* | 7/2008 | Thiyagarajan .......... B61L 3/006 701/19 |
| 2008/0167767 | A1* | 7/2008 | Brooks .................. B61L 3/006 701/20 |
| 2008/0183345 | A1* | 7/2008 | Chandra ................. B61L 3/006 701/19 |
| 2009/0187291 | A1* | 7/2009 | Daum .................... B61L 3/006 701/2 |
| 2011/0309920 | A1* | 12/2011 | Brooks ................. B61L 15/009 340/407.2 |
| 2012/0259531 | A1* | 10/2012 | Daum .................... B61L 3/006 701/102 |
| 2013/0171590 | A1* | 7/2013 | Kumar .................... B61L 3/006 434/62 |
| 2017/0147989 | A1* | 5/2017 | Onimaru ............ G06Q 10/1097 |
| 2017/0232983 | A1* | 8/2017 | Miglianico ............... B60T 17/22 701/19 |

FOREIGN PATENT DOCUMENTS

| | | |
|---|---|---|
| EP | 2374687 A2 | 10/2011 |
| EP | 2466361 A1 | 6/2012 |
| WO | 2010149715 A2 | 12/2010 |

\* cited by examiner

DRIVING ASSISTANCE DEVICE FOR A RAILWAY VEHICLE, COMPRISING PROGRESSIVE MEANS FOR INDICATING INSTRUCTIONS

CROSS REFERENCE TO RELATED APPLICATIONS

This application claims priority under 35 USC § 119 of French Patent Application No. 16 51208 filed on Feb. 15, 2016.

FIELD OF THE INVENTION

The present invention relates to a driving assistance device for a railway vehicle.

BACKGROUND OF THE INVENTION

The energy consumption of a railway vehicle is directly related to the speed thereof. Thus, methods exist for determining an optimal speed for the railway vehicle, making it possible to minimize the energy consumption of this vehicle, while meeting the schedule requirements that a railway vehicle must typically respect.

A driving assistance device for a railway vehicle is already known in the state of the art, including means for determining such an optimal speed. The driving assistance device also includes means for indicating this optimal speed to the conductor, so that he takes it into account when he drives the vehicle.

SUMMARY OF THE DESCRIPTION

The invention in particular aims to improve such a driving assistance device, in particular by making it easier for the conductor to use.

To that end, the invention in particular relates to a driving assistance device for a railway vehicle, comprising means for determining a target speed, characterized in that it includes:
 means for comparing an instantaneous speed of the railway vehicle with the target speed or with an interval around the target speed, and
 progressive means for indicating driving instructions for a conductor of the railway vehicle, said driving instructions including instructions for modifying the instantaneous speed in order to bring it closer to the target speed, the indicating means being configured to:
 indicate an instruction to increase the speed when the instantaneous speed is below a first predefined value, the instruction to increase the speed including an indicator with a variable value depending on the difference between the instantaneous speed and the target speed,
 indicate an instruction to decrease the speed when the instantaneous speed is above a second predefined value, the instruction to decrease the speed including an indicator with a variable value depending on the difference between the instantaneous speed and the target speed, and
 indicate an instruction to maintain the speed when the instantaneous speed is comprised between the first and second predefined values,
and in that the indicating means include a display panel, able to display the driving instructions, or a head-up display device, able to display the driving instructions in a field of view of the driver,
and wherein the indicating means are configured to:
 display an icon for an instruction to increase the speed when the instantaneous speed is below a first predefined value, the icon for the instruction to increase the speed comprising the variable value indicator, formed by an element with a variable height depending on the difference between the instantaneous speed and the target speed, and
 display an icon for an instruction to decrease the speed when the instantaneous speed is above a second predefined value, the icon for the instruction to decrease the speed comprising the variable value indicator, formed by an element with a variable height depending on the difference between the instantaneous speed and the target speed.

A driving assistance device according to the invention may further include one or more of the following features, considered alone or according to any technically possible combination(s).

The comparison means compare the instantaneous speed with an interval surrounding the target speed, defined by the first and second predefined values, and the indicating means for driving instructions are configured to: —display the icon for the instruction to increase the speed when the instantaneous speed is below the interval, —display the icon for the instruction to reduce the speed when the instantaneous speed is above the interval, —display an icon for an instruction to maintain the speed when the instantaneous speed is in the interval.

The indicating means are configured so that: —the icon for the instruction to increase the speed has a first color, —the icon for the instruction to maintain the speed has a second color different from the first, —the icon for the instruction to reduce the speed has a third color, different from the second, and preferably different from the first.

The indicating means are configured so that: —the icon for the instruction to increase the speed has an arrow pointing upward, and—the icon for the instruction to reduce the speed has an arrow pointing downward.

The indicating means are configured so that: when the speed increase instruction icon is displayed, the variable value indicator is the arrow pointing upward, the length of the arrow depending on the difference between the instantaneous speed and the target speed, and when the speed reduction instruction icon is displayed, the variable value indicator is the arrow pointed downward, the length of the arrow depending on the difference between the instantaneous speed and the target speed.

The indicating means are configured so that: the speed increase instruction icon includes a speed gauge, displaying the instantaneous speed and the target speed, the variable value indicator being the distance between the displayed instantaneous speed and target speed.

The speed decrease instruction icon includes a speed gauge, displaying the instantaneous speed and the target speed, the variable value indicator being the distance between the displayed instantaneous speed and target speed.

The indicating means include haptic means acting on a traction/braking control lever of the railway vehicle, the variable value indicator being the resisting force transmitted by the haptic means.

The comparison means also compare the instantaneous speed with a maximum target speed, and the driving instruction indicating means are configured to indicate a mandatory speed reduction instruction when the instantaneous speed is higher than the maximum speed.

The invention also relates to a driving assistance method for a railway vehicle, using a driving assistance device as previously defined, characterized in that it includes:

a step for determining a target speed, a step for comparing an instantaneous speed of the railway vehicle with the target speed or with an interval around the target speed, and a step for indicating driving instructions for a conductor of the railway vehicle, said driving instructions including instructions for modifying the instantaneous speed in order to bring it closer to the target speed, such that:

when the instantaneous speed is below a first predefined value, a speed increase instruction is indicated, the speed increase instruction including an indicator with a variable value depending on the difference between the instantaneous speed and the target speed, when the instantaneous speed is above a second predefined value, a speed decrease instruction is indicated, the speed decrease instruction including an indicator with a variable value depending on the difference between the instantaneous speed and the target speed, and when the instantaneous speed is comprised between the first and second predefined values, a speed maintenance instruction is indicated.

BRIEF DESCRIPTION OF THE DRAWINGS

The invention will be better understood using the following description, provided solely as an example and done in reference to the appended figures, in which.

DETAILED DESCRIPTION

Figure 1:
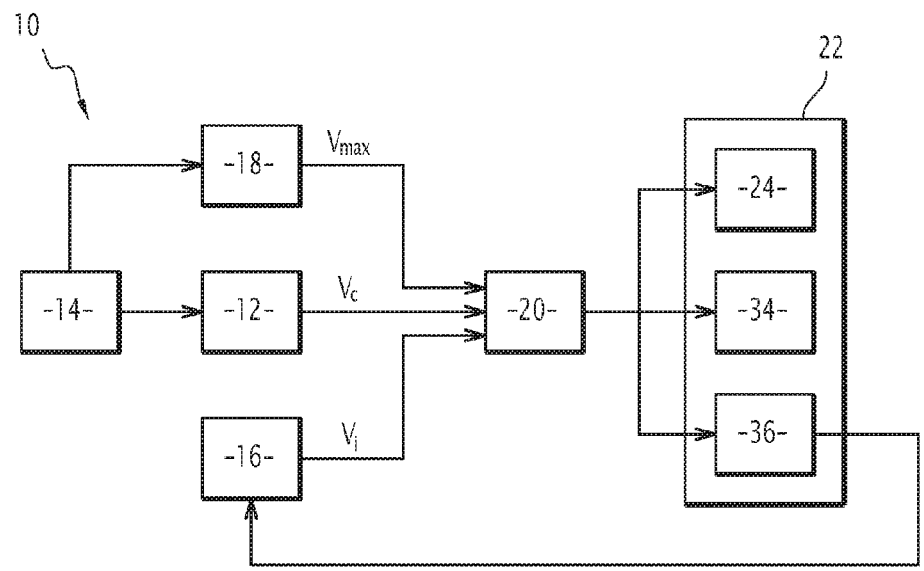
FIG. 1 schematically shows a driving assistance device according to one example embodiment of the invention.

FIG. 1 shows a driving assistance device 10 intended to equip a railway vehicle.

A railway vehicle being intended to travel on a railroad track, it follows a predefined path, such that it is possible to anticipate an optimal movement speed of the railway vehicle, in particular in order to minimize the energy consumption of the vehicle, while taking the schedules that this vehicle must respect into account.

More specifically, the railroad track may be divided into a plurality of track sections, an optimal speed being able to be defined on each section. Indeed, the optimal speed is typically different depending on the section on which the railway vehicle is found, in particular based on whether the section is straight or curved, going downhill or uphill, etc. The length of a track section is chosen during the configuration of the driving assistance device 10, and may be any length. It is also possible to provide various track sections with different lengths.

Thus, the driving assistance device 10 according to the invention includes means 12 for determining a target speed $V_c$, for example corresponding to an optimal speed making it possible to limit the energy consumption of the railway vehicle.

As previously indicated, the optimal speed depends on the track section on which the railway vehicle is located, such that it is necessary to be able to determine the track section on which the railway vehicle is located. To that end, the driving assistance device 10 advantageously includes localization means 14, for example a satellite guidance device.

The determination means 12 may be of any conceivable type.

According to a first example, these determination means 12 are formed by a memory in which, for each track section, a predetermined target speed $V_c$ (in particular an optimal speed) corresponding to this track section is stored. Thus, at any moment, the localization means 14 make it possible to determine the track section on which the railway vehicle is found, and the determination means 12 deduce the target speed $V_c$ therefrom.

Each predetermined target speed $V_c$ is computed beforehand, taking into account the energy consumption of the railway vehicle and the schedules that must be respected by this railway vehicle. Other characteristics may be taken into account to determine the target speed $V_c$, in particular characteristics of the vehicle (such as its number of cars and its length), characteristics of the track section in question (in particular if it includes at least one ascent and/or at least one descent, if it is in a straight line and if it includes curves, in which case the curve radii of these curves may also be taken into account) and environmental conditions (for example, the season).

According to a second example, the determination means 12 include means for the real-time computation of the target speed $V_c$, comprising a computation algorithm determining the target speed $V_c$ as a function of the aforementioned characteristics. Such real-time computation means can also account for any delay or advance on the schedules that the railway vehicle must respect.

According to a third example, the determination means 12 include learning means. In this case, when the railway vehicle travels along the railroad track, the learning means record the speed of the railway vehicle on each considered track section on each journey. Next, during subsequent journeys, the learning means choose, on each track section, the speed that appears most appropriate from among those recorded on this section, this most appropriate speed then forming the target speed $V_c$.

The driving assistance device 10 also includes traditional traction level control means 16, generally formed by a traction/braking control lever. This control lever 16 is actuated by the conductor of the railway vehicle, to apply a traction or braking level to this railway vehicle making it possible to modify the instantaneous speed $V_i$, desired by the conductor, to bring it closer to the target speed $V_c$.

The driving assistance device also includes means 18 for determining a maximum speed $V_{max}$, based on the track section on which the railway vehicle is located.

These means 18 for determining the maximum speed $V_{max}$ are connected to the localization means 14 indicating the track section on which the railway vehicle is located, in order for the maximum speed determination means 18 to deduce the maximum authorized speed $V_{max}$ for the railway vehicle therefrom.

The maximum speed determination means 18 for example include a database in which a respective predetermined maximum speed $V_{max}$ is entered for each track section.

Alternatively, the maximum speed $V_{max}$ could be provided in real-time by a centralized control center, or by terminals positioned along the railroad track.

The driving assistance device 10 further includes means 20 for comparing the instantaneous speed $V_i$ of the railway vehicle, depending on the control means 16, with the target speed $V_c$ entered by the determination means 12. Advantageously, a target speed interval is defined around the target speed $V_c$, and the comparison means 20 compare the instantaneous speed $V_i$ with this target speed interval. This interval is defined by a first speed lower than the target speed $V_c$ and a second speed higher than the target speed $V_c$.

The first and second speeds are therefore predetermined based on the target speed $V_c$. Thus, these first and second speeds are determined dynamically, by subtracting, adding, respectively, a predefined value from or to the target speed $V_c$, or alternatively by applying a percentage to this target speed $V_c$.

Alternatively, the first and second speeds are identical, equal to the target speed $V_c$.

Advantageously, these comparison means 20 also compare the instantaneous speed $V_i$ with the maximum speed $V_{max}$ entered by the determination means 18.

These comparison means 20 provide the results of the comparisons to progressive means 22 for indicating driving instructions to the conductor of the railway vehicle.

These driving instructions in particular include instructions for modifying the instantaneous speed $V_i$ in order to bring it closer to the target speed $V_c$, in particular an instruction to increase the speed when the instantaneous speed $V_i$ is lower than the target speed $V_c$, an instruction to reduce the speed when the instantaneous speed $V_i$ is higher than the target speed $V_c$, and an instruction to maintain this speed when the instantaneous speed $V_i$ is substantially equal to the target speed $V_c$.

The instructions to increase and reduce the speed each comprise at least one indicator with a variable value depending on the difference between the instantaneous speed $V_i$ and the target speed $V_c$.

The progressive indicating means 22 may include different possible display devices.

For example, the progressive indicating means 22 include a display panel 24, in particular a display screen, able to display driving instructions, in the form of driving instruction icons.

Alternatively or additionally, the indicating means 22 include a head-up display device 34, able to display the driving instructions in a field of view of the driver. Such a head-up display device 34 is known in itself and will therefore not be described in more detail.

In these cases, the progressive indicating means 22 are configured to:
- display a speed increase instruction icon when the instantaneous speed $V_i$ is below the target speed $V_c$ interval; i.e., below the first predetermined speed,
- display a speed decrease instruction icon when the instantaneous speed $V_i$ is above the target speed $V_c$ interval; i.e., above the second predetermined speed, and
- display a speed maintenance instruction icon when the instantaneous speed $V_i$ is in the target speed $V_c$ interval.

Furthermore, when the instantaneous speed $V_i$ is higher than the maximum speed $V_{max}$, the indicating means 22 indicate a mandatory speed reduction instruction.

Advantageously, the indicating means 22 also indicate the values of the instantaneous speed $V_i$, the target speed $V_c$ and the maximum speed $V_{max}$.

Each driving instruction icon includes a variable value indicator, in particular a variable size element, for example a speed gauge 25, as shown in FIGS. 2 to 5.

Alternatively, as shown in FIGS. 6 to 11, each instruction icon includes an arrow of variable size depending on the instructions to modify the instantaneous speed $V_i$ to bring it closer to the target speed $V_c$.

The instruction icons displayed by the head-up display device 34 are for example identical to those displayed by the display panel 24, and include a speed gauge 25 as shown in FIGS. 2 to 5, and/or arrows as shown in FIGS. 6 to 11.

FIGS. 2 to 5 show the speed gauge 25 displayed by the indicating means 22, in particular by the display panel 24 and/or the head-up display device 34, in different respective situations. This speed gauge 25 includes a first line showing the instantaneous speed $V_i$, and a second line showing the target speed $V_c$. In this case, the variable value indicator is the distance between the first and second lines.

Figures 2, 3, 4, 5:
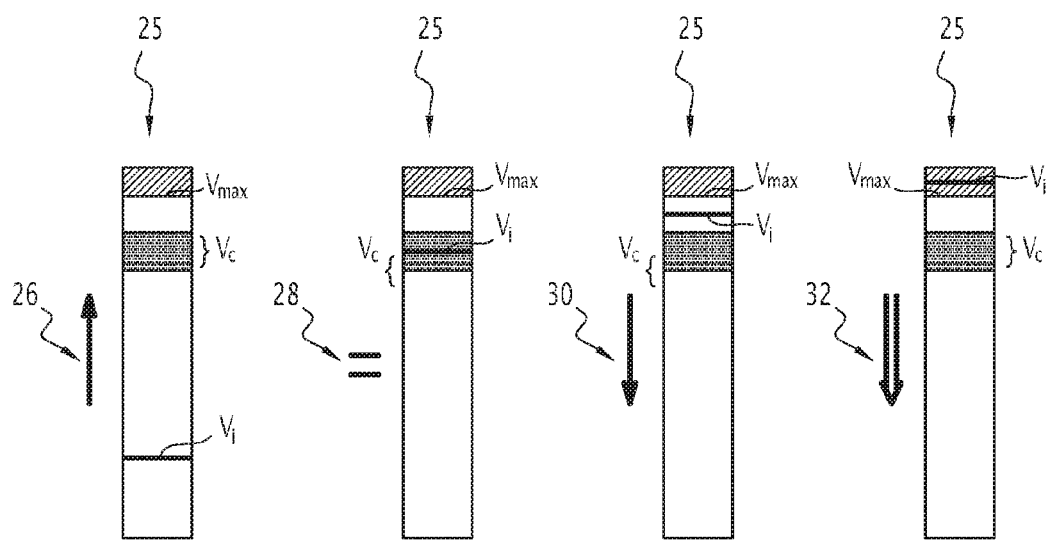
FIGS. 2 to 5 show driving instruction icons, in four separate respective situations, displayed by display means of the driving assistance device of FIG. 1.

In FIG. 2, the instantaneous speed $V_i$ is below the target speed interval $V_c$, such that the indicating means 22 display a speed increase instruction icon, comprising an arrow 26 pointing upward.

Alternatively or additionally, the speed gauge 25 is displayed in a first color, for example yellow, when the instantaneous speed $V_i$ is below the target speed interval $V_c$. Thus, the conductor is invited to actuate the control means 16 in order to modify the traction level so as to comply with the speed increase instruction.

FIG. 3 shows the speed gauge 25 when the instantaneous speed $V_i$ is in the target speed $V_c$ interval. In this case, the indicating means display a speed maintenance instruction icon. This speed maintenance instruction icon for example includes an "equal" sign 28.

Alternatively, the instruction icon may include only the speed gauge 25, the speed maintenance indication then being embodied by an absence of speed of modification instruction. In the same manner as before, it is possible to provide a color code to indicate the speed maintenance instruction, by displaying the speed gauge 25 in a second color different from the first, for example green, when the instantaneous speed $V_i$ is in the target speed $V_c$ interval.

FIG. 4 shows the speed gauge 25 when the instantaneous speed $V_i$ is above the target speed $V_c$ interval. In this case, the indicating means 22 display a speed reduction instruction icon, for example including a down arrow 30. Alternatively or additionally, the color of the speed gauge 25 can be modified, and assume a third color, different from the second color, and different from the first color, for example orange, to indicate that the instantaneous speed $V_i$ is above the target speed interval $V_c$. Alternatively, the third color is identical to the first color.

FIG. 5 shows the speed gauge when the instantaneous speed $V_i$ is above the maximum speed $V_{max}$. In this case, the indicating means 22 display a mandatory speed reduction instruction icon, for example including a downward double arrow 32, or alternatively a down arrow identical to the down arrow 30. Alternatively or additionally, the color of the speed gauge can be modified assume a fourth color, different from the first, second and third colors, for example red, to indicate that the instantaneous speed $V_i$ is above the maximum speed $V_{max}$.

FIGS. 6 to 11 show instruction icons displayed by the indicating means 22, in particular by the display panel 24 and/or the head-up display device 34, in different respective situations.

In this case, the variable value indicator is formed by the displayed arrow, the height of which varies depending on the difference between the instantaneous speed $V_i$ and the target speed $V_c$.

Figure 6:
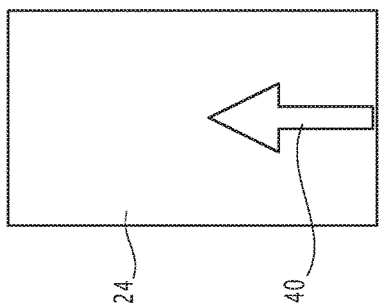

In FIG. 6, the instantaneous speed $V_i$ is below and remote from the target speed interval $V_c$, such that the indicating means 22 display a speed increase instruction icon, including a large arrow 40, pointing upward. The arrow 40 preferably has a first color, for example yellow. Thus, the conductor is invited to actuate the control means 16 in order to modify the traction level so as to comply with the speed increase instruction.

Figure 7:
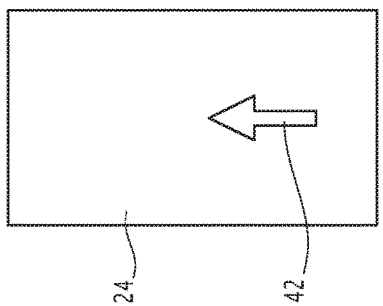

As shown in FIG. 7, when the instantaneous speed $V_i$ comes closer to the target speed $V_c$, while remaining below this target speed $V_c$, the indicating means 22 display a speed increase instruction icon, including a medium-sized arrow 42, pointing upward, for example in yellow. The conductor is thus invited to continue the acceleration.

Figure 8:
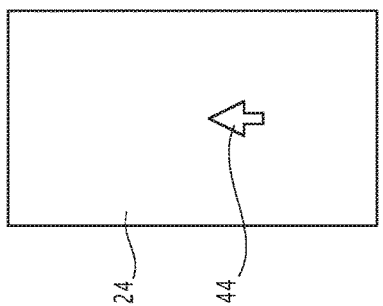

As shown in FIG. 8, when the instantaneous speed $V_i$ is close to the target speed $V_c$ interval, while remaining to load this target speed $V_c$, the indicating means 22 display a speed increase instruction icon, including a small arrow 44, pointing upward, for example in yellow. The conductor is thus invited to reduce the traction force.

Figure 9:
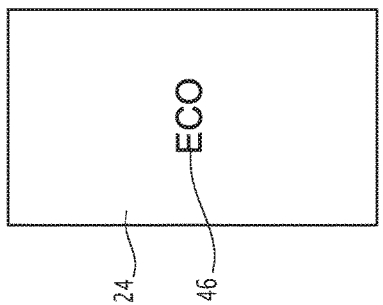
FIGS. 6 to 11 show driving instruction icons according to one alternative embodiment, in six separate respective situations, displayed by display means of the driving assistance device of FIG. 1.

As shown in FIG. 9, when the instantaneous speed $V_i$ is in the target speed $V_c$ interval, the indicating means 22 display a speed maintenance instruction icon, including an image 46 symbolizing the maintenance of the speed, for example an "equal" sign or a message, in particular "ECO", indicating that an economical speed has been reached. In the same manner as before, it is possible to provide a color code to indicate the speed maintenance instruction, by displaying this instruction icon in a second color different from the first, for example green.

Figure 10:
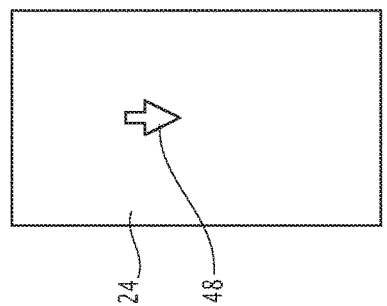

As shown in FIG. 10, when the instantaneous speed $V_i$ is slightly higher than the target speed $V_c$ interval, the indicating means 22 display a speed decrease instruction icon, for example including a small down arrow 48. The conductor is thus invited to reduce the instantaneous speed $V_i$.

Alternatively or additionally, the color of the arrow 48 can be modified, and assume a third color, different from the second color, and different from the first color, for example orange, to indicate that the instantaneous speed $V_i$ is above the target speed interval $V_c$. Alternatively, the third color is identical to the first color.

Figure 11:
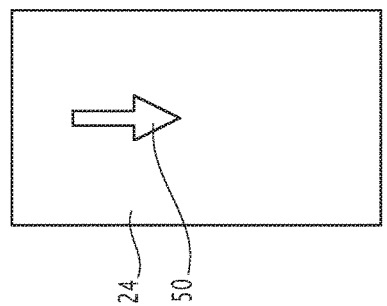

If the instantaneous speed $V_i$ increases further, the indicating means 22 display a speed decrease instruction icon, for example including a medium-sized down arrow 50, as shown in FIG. 11. The conductor is thus invited to reduce the instantaneous speed $V_i$.

The down arrow 50 can be another color, for example read, when the instantaneous speed $V_i$ is above the maximum speed $V_{max}$.

It will be noted that the size of the up arrow 40, 42, 44 or down arrow 48, 50 depends on the difference between the instantaneous speed $V_i$ and the target speed $V_c$. This allows the conductor to determine whether he is approaching the target speed $V_c$.

Alternatively or additionally, the indicating means 22 include haptic means 36 acting on the traction/braking control lever 16 of the railway vehicle. Such haptic (or tactile-kinesthetic) means 36 are intended to modify the haptic feeling of the conductor when he actuates the control lever 16.

The haptic means 36 can also be used to actuate the control lever to return it to a neutral position, like a spring would do. For example, the haptic means 36 are formed by a motor that interacts with the axis of the control lever. This motor is for example of the contactless or brushless type. This feature makes it possible to meet the needs of several driving modes of rolling stock: tram, subway, regional train, high-speed train, locomotive.

When the instantaneous speed $V_i$ is below the target speed $V_c$, the resistance forces transmitted by the haptic means 36 correspond to a first predetermined resistance range, in which the resistance forces are then reduced to correspond to the equivalent forces of a traditional manipulator.

When the instantaneous speed $V_i$ is above the target speed $V_c$, the resistance forces transmitted by the haptic means 36 correspond to a second predetermined resistance range, in which the resistance forces are higher than those of the first range, the resistance forces thus being increased to go from the first range to the second range, then maintained at a resistance force greater than the equivalent forces of a traditional manipulator. By feeling this change in resistance, the conductor is encouraged not to exceed the recommended traction level.

In this case, the variable value indicator is the resistance force transmitted by the haptic means, this force decreasing as the instantaneous speed $V_i$ comes closer to the target speed $V_c$ when the instantaneous speed $V_i$ is lower than the target speed $V_c$, and increasing as the instantaneous speed $V_i$ moves away from the target speed $V_c$ when the instantaneous speed $V_i$ is higher than the target speed $V_c$.

The driving assistance device 10 makes it possible to carry out a driving assistance method, including the following steps:

a step for determining a target speed $V_c$ (by the determination means 12), a step for comparing an instantaneous speed $V_i$ of the railway vehicle with the target speed $V_c$ (by the comparison means 20), and a step for displaying (by the display means 22) a driving instruction icon for a conductor of the railway vehicle, said driving instructions including instructions for modifying the instantaneous speed $V_i$ in order to bring it closer to the target speed $V_c$, such that:

when the instantaneous speed $V_i$ is below a first predefined value, a speed increase instruction is indicated, when the instantaneous speed $V_i$ is above a second predefined value, a speed decrease instruction is indicated, and when the instantaneous speed $V_i$ is comprised between the first and second speeds, a speed maintenance instruction is indicated.

It will be noted that the invention is not limited to the embodiment previously described, but could assume various alternatives.

In particular, the target speed could be determined with criteria other than the aforementioned optimal speed. For example, the target speed could take into account only the schedule to be respected, or only the energy consumption.

The invention claimed is:

1. A driving assistance device for a railway vehicle, comprising means for determining a target speed, wherein the driving assistance device includes:

comparison means for comparing an instantaneous speed of the railway vehicle with an interval around the target speed, and indicating means comprising a progressive display device for indicating driving instructions for a conductor of the railway vehicle, the driving instructions including instructions for modifying the instantaneous speed in order to bring it closer to the target speed, said progressive display device being configured to:
  indicate an instruction to increase the instantaneous speed when the instantaneous speed is below a first predefined value, the instruction to increase the instantaneous speed including an indicator with a variable value depending on the difference between the instantaneous speed and the target speed,
  indicate an instruction to decrease the instantaneous speed when the instantaneous speed is above a second predefined value, the instruction to decrease the instantaneous speed including an indicator with a variable value depending on the difference between the instantaneous speed and the target speed, and
  indicate an instruction to maintain the instantaneous speed when the instantaneous speed is comprised between the first and second predefined values,
and in that said progressive display device includes a display panel, able to display the driving instructions, or a head-up display device, able to display the driving instructions in a field of view of the driver,
and wherein said progressive display device is configured to:
  display a first icon for an instruction to increase the instantaneous speed when the instantaneous speed is below the first predefined value, the first icon for the instruction to increase the instantaneous speed comprising the variable value indicator, formed by an element with a variable height depending on the difference between the instantaneous speed and the target speed, and
  display a second icon for an instruction to decrease the instantaneous speed when the instantaneous speed is above the second predefined value, the second icon for the instruction to decrease the instantaneous speed comprising the variable value indicator, formed by an element with a variable height depending on the difference between the instantaneous speed and the target speed,
wherein the interval surrounding the target speed is defined by the first and second predefined values, the second predefined value being superior to the first predefined value, and the processive display device for driving instructions is configured to:
  display the first icon for the instruction to increase the instantaneous speed when the instantaneous speed is below the interval,
  display the second icon for the instantaneous speed reduction instruction when the instantaneous speed is above the interval, and
  display an instantaneous speed maintenance instruction icon when the instantaneous speed is in the interval.

2. The driving assistance device according to claim 1, wherein the progressive display device is configured so that:
  the first icon for the instantaneous speed increase instruction has a first color,
  the instantaneous speed maintenance instruction icon has a second color different from the first, and
  the second icon for the instantaneous speed reduction instruction has a third color, different from the second.

3. The driving assistance device according to claim 1, wherein the progressive display device is configured so that:
  the first icon for the instantaneous speed increase instruction has a first arrow pointing upward, and
  the second icon for the instantaneous speed decrease instruction has a second arrow pointing downward.

4. The driving assistance device according to claim 3, wherein the progressive display device is configured so that:
  when the first icon for the instantaneous speed increase instruction is displayed, the variable value indicator is the first arrow pointing upward, the length of the first arrow depending on the difference between the instantaneous speed and the target speed, and
  when the second icon for the instantaneous speed decrease instruction is displayed, the variable value indicator is the second arrow pointing downward, the length of the second arrow depending on the difference between the instantaneous speed and the target speed.

5. The driving assistance device according to claim 1, wherein the progressive display device is configured so that:
  the first icon for the instantaneous speed increase instruction includes a first speed gauge, displaying the instantaneous speed and the target speed, the variable value indicator being the distance between the instantaneous speed and target speed displayed on the first speed gauge,
  the second icon for the instantaneous speed decrease instruction includes a speed gauge, displaying the instantaneous speed and the target speed, the variable value indicator being the distance between the displayed instantaneous speed and target speed displayed on the second speed gauge.

6. The driving assistance device according to claim 1, comprising a traction/braking control lever for the railway vehicle, movable between a braking position and a traction position, the driving assistance device including a haptic device acting on the traction/braking control lever of the railway vehicle, the haptic device transmitting a resisting force as follows:
  when the instantaneous speed is below the first predefined value, the resisting force is opposed to a movement of the traction/braking control lever toward the braking position, the resisting force having a variable intensity depending on the difference between the instantaneous speed and the target speed,
  when the instantaneous speed is above the second predefined value, the resisting force is opposed to a movement of the traction/braking control lever towards the traction position, the resisting force having a variable intensity depending on the difference between the instantaneous speed and the target speed, and
  when the instantaneous speed is between the first and second predefined values, the resisting force is zero.

7. The driving assistance device according to claim 1, wherein the comparator also compares the instantaneous speed with a maximum target speed, and the progressive display device is configured to indicate a mandatory speed reduction instruction when the instantaneous speed is higher than the maximum speed.

8. A driving assistance method for a railway vehicle, wherein the method includes:
  determining a target speed, by use of determining means;
  comparing an instantaneous speed of the railway vehicle with the target speed or with an interval around the target speed, by use of comparison means; and
  indicating driving instructions for a conductor of the railway vehicle, said driving instructions including instructions for modifying the instantaneous speed in order to bring it closer to the target speed, by use of indicating means, such that:
    when the instantaneous speed is below a first predefined value, a speed increase instruction is indicated, the speed increase instruction including an indicator with a variable value depending on the difference between the instantaneous speed and the target speed, when the instantaneous speed is above a second predefined value, a speed decrease instruction is indicated, the speed decrease instruction including an indicator with a variable value depending on the difference between the instantaneous speed and the target speed, and when the instantaneous speed is between the first and second predefined values, a speed maintenance instruction is indicated, wherein the driving instructions are indicated on a progressive display device chosen between a display panel or a head-up display device, and wherein the progressive display device is configured to:

display a first icon for an instruction to increase the instantaneous speed when the instantaneous speed is below the first predefined value, the first icon for the instruction to increase the instantaneous speed comprising the variable value indicator, formed by an element with a variable height depending on the difference between the instantaneous speed and the target speed, and display a second icon for an instruction to decrease the instantaneous speed when the instantaneous speed is above the second predefined value, the second icon for the instruction to decrease the instantaneous speed comprising the variable value indicator, formed by an element with a variable height depending on the difference between the instantaneous speed and the target speed, wherein the comparison means compare the instantaneous speed with an interval surrounding the target speed, defined by the first and second predefined values, and wherein the progressive display device for driving instructions is configured to:

display the first icon for the instruction to increase the instantaneous speed when the instantaneous speed is below the interval, display the second icon for the instantaneous speed reduction instruction when the instantaneous speed is above the interval, and display an instantaneous speed maintenance instruction icon when the instantaneous speed is in the interval.

* * * * *